United States Patent
Chen (10) Patent No.: US 7,956,935 B2
(45) Date of Patent: Jun. 7, 2011

(54) CONTROL METHOD AND DEVICE FOR CONTROLLING A CONTROLLABLE DEVICE

(75) Inventor: Feng Chen, Nashville, TN (US)

(73) Assignee: Toshiba America Information Systems, Inc., Irvine, CA (US)

( * ) Notice: Subject to any disclaimer, the term of this patent is extended or adjusted under 35 U.S.C. 154(b) by 479 days.

(21) Appl. No.: 11/104,515

(22) Filed: Apr. 13, 2005

(65) Prior Publication Data

US 2006/0236336 A1    Oct. 19, 2006

(51) Int. Cl.
H04N 5/44    (2006.01)
(52) U.S. Cl. .......................... 348/734; 348/731; 348/732
(58) Field of Classification Search .................. 348/734, 348/731–732, 385.1, 386.1, 563, 569, 553, 348/906, 570; 725/56, 41, 20, 151, 57; H04N 5/44
See application file for complete search history.

(56) References Cited

U.S. PATENT DOCUMENTS

| | | | |
|---|---|---|---|
| 6,084,645 A * | 7/2000 | Park et al. ..................... | 348/734 |
| 6,313,886 B1 | 11/2001 | Sugiyama ..................... | 348/731 |
| 6,661,472 B2 | 12/2003 | Shintani et al. ............... | 348/732 |
| 6,707,508 B1 | 3/2004 | Mears et al. .................. | 348/731 |
| 6,750,802 B1 | 6/2004 | Olen ............................. | 341/176 |
| 6,766,526 B1 | 7/2004 | Ellis ................................. | 725/57 |
| 7,154,564 B2 * | 12/2006 | Kim .............................. | 348/731 |
| 7,281,259 B2 * | 10/2007 | Takagi et al. .................. | 725/38 |
| 2001/0054183 A1 | 12/2001 | Curreri ........................... | 725/56 |
| 2002/0104103 A1 | 8/2002 | Takagi et al. ................. | 725/151 |
| 2004/0049782 A1 | 3/2004 | Shintani et al. ................. | 725/38 |
| 2004/0058641 A1 | 3/2004 | Acker .......................... | 455/3.02 |
| 2008/0320523 A1 * | 12/2008 | Morris et al. .................. | 725/47 |

* cited by examiner

*Primary Examiner* — Trang U Tran
(74) *Attorney, Agent, or Firm* — Nixon & Vanderhye P.C.

(57) ABSTRACT

An example method and device for controlling a controllable device involves using a control device comprising a numeric keypad and a delimiter key. Control operations for the controllable device are respectively associated with digits of the numeric keypad and one of the control operations is initiated by pressing the delimiter key followed by the digit key associated with the one control operation. Control operations include by way of example channel tuning operations for a television, input selection operations for a television and menu screen selections.

31 Claims, 4 Drawing Sheets

CONTROL METHOD AND DEVICE FOR CONTROLLING A CONTROLLABLE DEVICE

BACKGROUND AND SUMMARY

This application relates to a control method and device for a controllable device such as a consumer electronics product (e.g., a digital television) and, more particularly, to such a control method and device that simplifies certain operations such as, by way of example, channel tuning operations for a digital television.

With the advent of digital television, the complexity of control operations such as channel tuning has increased. For example, digital channels often include minor channels (or sub-channels) so that a user not only has to specify the main channel (e.g., channel 256), but also the sub-channel (e.g., 1, 2, 3, etc.) The main channel and sub-channel are typically delimited or separated by a delimiter such as a dash ("-") or a period (".") so that a channel 256-3 would be tuned by sequentially pressing the "2", "5", "6", "-" and "3" buttons on a channel tuning device such as a remote control. Consequently, a viewer or user must press five buttons to tune to a particular digital channel. This complicates tuning due to the possibility of erroneous key presses and also reduces the speed at which a viewer may quickly tune from one channel to another (i.e., channel surf).

Various mechanisms have been developed to purportedly simplify channel tuning operations. For example, interactive program guides allow viewers to see program listings, descriptions, etc. However, such program guides can themselves be complicated to operate, thereby reducing a viewer's ability to quickly tune from one channel to another. Another technique for simplifying channel tuning operations involves favorite channel lists in which a viewer can configure a list of favorite channels and tune from one channel to another on the list. However, this technique often involves a dedicated remote control key, requiring the manufacturer to include an additional remote control key and adding to the complexity of the remote control. In addition, the favorite channel key is often positioned differently for different remote controls and the favorite channel function may be invoked differently from one television to another. Thus, the favorite channel tuning operation is inconsistent from one remote control and/or television to another.

This application describes an illustrative example control method and device that reduces the complexity of control operations for a controllable device such as a television or other consumer electronic product. For example, a viewer or user may tune to television channels using only two key presses. Specifically, in one example implementation, a viewer can associate up to ten different television channels with the digit keys 0-9 on a tuning device such as a remote control. Thus, for example, channel 256-3 may be associated with "0", channel 54-2 with "1", etc. To tune to these channels, the viewer simply presses a predetermined key such as a delimiter key (e.g., "-" or ".") and then presses one of the digits. Thus, pressing "-" followed by "0" will tune the television to channel 256-3. This operation reduces the number of keys needed to tune to a channel In addition, because most remote controls include a delimiter key, there is no need to add new keys to the remote control. Further, the channel tuning operation will be fairly consistent from one remote control to another because the delimiter key tends to be positioned among, or at least adjacent to, the digit keys.

These and other features and advantages of the control method and device will be better understood from a reading of the following detailed description in conjunction with the accompanying drawings.

DETAILED DESCRIPTION OF EXAMPLE EMBODIMENTS

Figure 1:
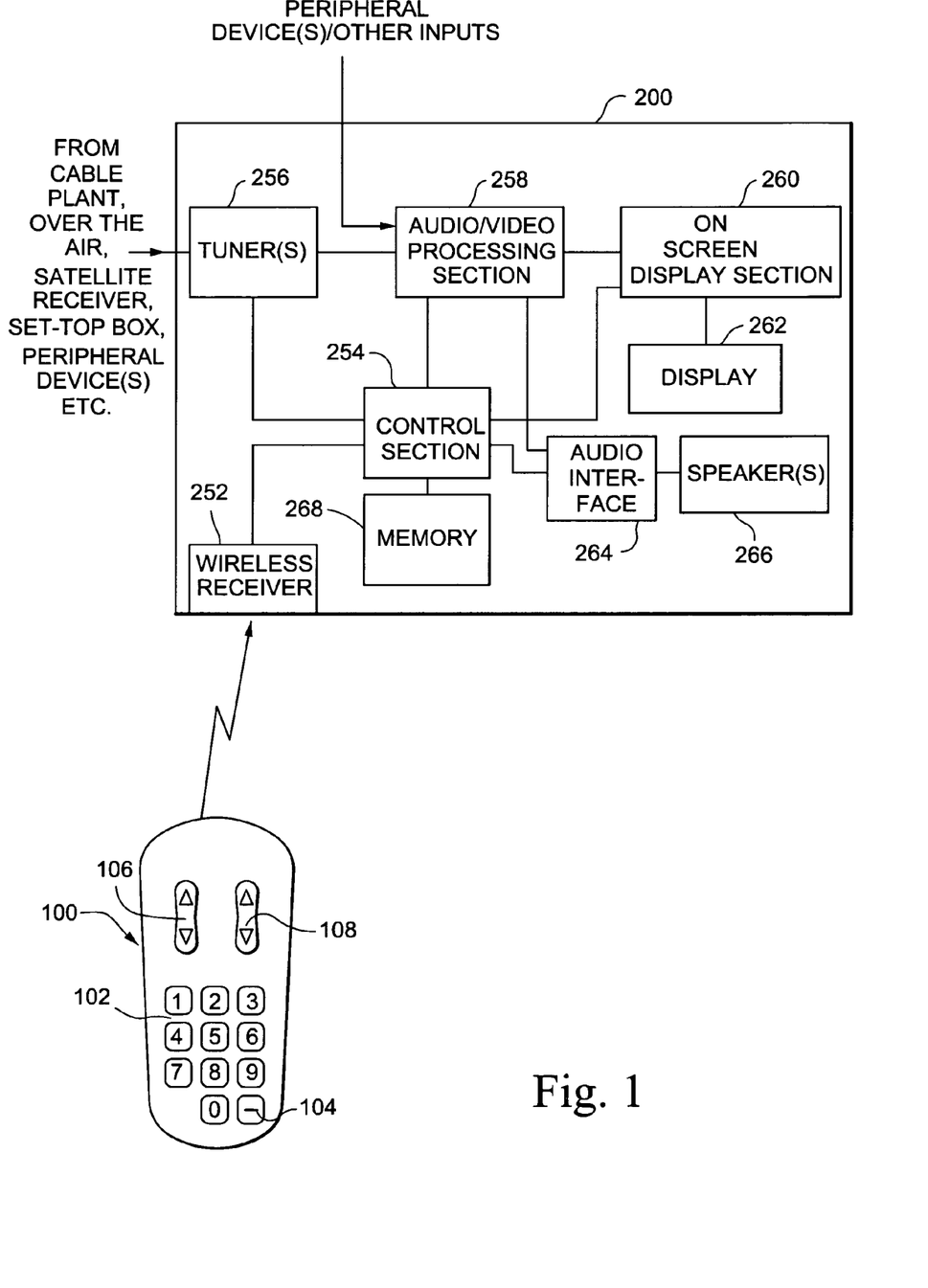
FIG. 1 shows an example remote control 100 and an example television 200.

FIG. 1 shows an example remote control 100 for remotely controlling a television 200. Remote control 100 includes a numeric keypad 102 with the numbers 0-9, a delimiter key 104, channel up/down key 106 and volume up/down key 108. Numeric keypad 102, delimiter key 104, channel up/down key 106 and volume up/down key 108 are collectively shown as an input section in FIG. 2. It will be understood that the input section will generally include additional keys (e.g. an "Enter" key, a "Select" key, arrow keys, etc.) and input devices for other functionalities. By pressing appropriate keys and/or actuating appropriate input devices on the remote control 100, a viewer or user may control various functions and operations of television 200. For example, by pressing the channel up/down key 106, a viewer may tune upward/downward from the currently tuned channel to the next/previous available channel.

Figure 2:
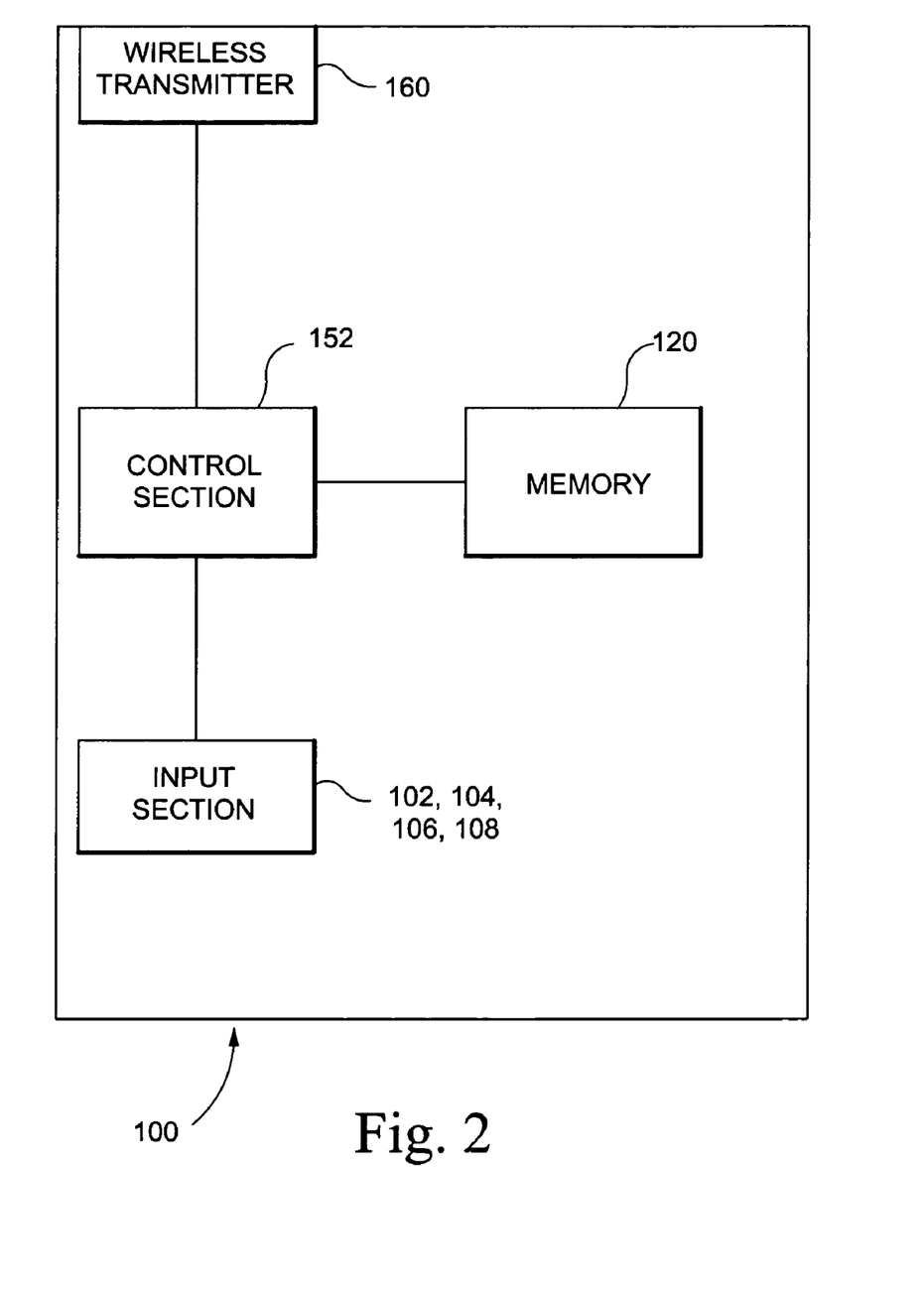
FIG. 2 is a block diagram showing the details of the example remote control 100.
Figure 3A:
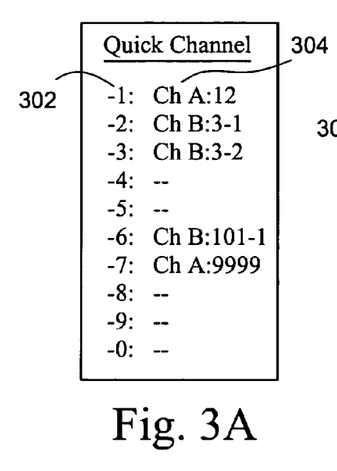
FIGS. 3A-3C are example display screens for use during quick channel tuning operations.
Figure 3B:
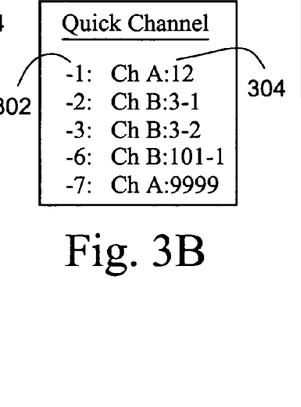
Figure 3C:
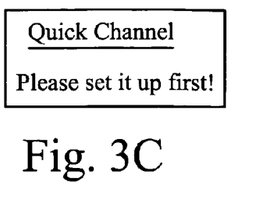
Figure 4:
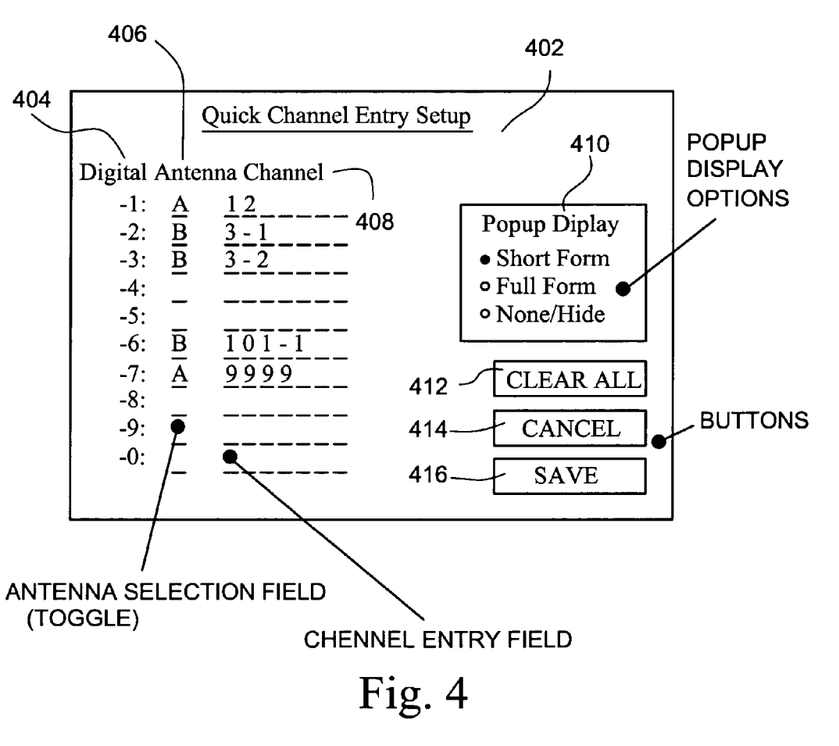
FIG. 4 is an example set-up screen.

When the viewer presses one of the keys on remote control 100, the key press is detected by a control section 152 (see FIG. 2). The control section 152 may be implemented as a microprocessor, a microcontroller, logic array, application specific integrated circuit (ASIC), etc., or some combination of those elements. The control section 152 controls a wireless transmitter 160 to send a signal indicative of the pressed keys to a wireless receiver 252 of television 200. Wireless receiver 252 supplies the received signals to a control section 254 of television 200 which processes the signals and takes any appropriate action. If the channel up/down key 106 is pressed, for example, control section 254 controls tuner 256 of television 200 to tune from the currently tuned channel to the next/previous available channel. The output of the tuner is supplied to audio/video processing section 258 which demodulates, decodes and otherwise processes the tuned signal and provides outputs to an on-screen graphics display section 260 and an audio interface 264. The on-screen graphics display section 260 controls the display of video on display 262 and provides on screen graphics (such as shown in FIGS. 3 and 4) in pop-up windows or overlaid onto the video display. Audio is output from speakers 266.

Like control section 152, control section 254 may be implemented as a microprocessor, a microcontroller, logic array, ASIC, etc., or some combination of these elements. As suggested in FIG. 1, tuner 256 may in fact be constituted by two or more separately controllable tuners. The input(s) to tuner 256 may be supplied from a cable plant, an over-the-air transmission, a satellite receiver, set-top, and/or other peripheral device(s) such as a VCR, a DVD player, a DVR, and the like. Peripheral devices may also be connected to the television 200 by signal paths (e.g., 1394, HDMI, DVI) to/from audio signal processing section 258. Signals from the various signal sources (e.g., the inputs to tuner 256 and to audio/video processing section 258) are selected for output on display 262 and speakers 266 in accordance with signal selection circuitry (not shown) that may be incorporated in the audio/video processing section and controlled via selection signals from control section 254. For example, a picture-in-picture display may be generated by selecting two of the inputs (e.g., from a tuned channel and a DVD player, or from two channels respectively tuned by a different tuners).

Although element 160 is shown as a wireless transmitter and element 252 is shown as a wireless receiver, one or both of these elements may be a wireless transmitter and receiver to permit, for example, two-way communication between remote control 100 and television 200.

As mentioned above, digital television systems have introduced the concept of major and minor channels. Currently, both the major and minor channels can range from 1 to 999. While this scheme allows broadcasters to offer significantly more programs/channels to consumers, it complicates the channel tuning operation. The example remote control 100 provides a quick channel entry feature that allows viewers to quickly tune to different channels. With this feature, the viewer simply presses the delimiter key 104, followed by one of the ten digits 0-9. If the pressed digit has been associated with a channel, the television will be tuned to that channel.

As described above, the television may have multiple inputs, which allows a viewer to connect multiple signal sources. For example, for a television that includes two "antenna" inputs, the viewer can connect one to cable signals and the other to an over-the-air antenna. In this case, if the viewer wants to watch a channel on an antenna input different than the antenna input of the currently tuned channel, he/she needs to change the input first, then change the channel. This further complicates the channel tuning operation. The quick channel entry feature can include antenna selection (e.g., "A" or "B") for each channel, as shown on FIGS. 3 and 4 and discussed below. As a result, after a quick channel tuning entry, if the channel to be tuned is on another antenna input, for example, the television will change the antenna first, then the channel. This provides even more convenience to the viewer.

The quick channel entry feature will now be described in greater detail. While watching television, the viewer presses the delimiter key 104 and then one of the digit keys 0-9 on the remote control. The television is then tuned to a channel that has been associated with the pressed digit key. For example, pressing delimiter 104 followed by the "6" key will tune to channel 101-1 on antenna input "B" if the "1" key has been associated with the channel 101-1 of an antenna input B. If no channel is associated with the pressed digit, then the television responds as if an invalid channel number has been entered. For example, the television remains tuned to the current channel and an on-screen graphical or textual display is provided to indicate entry of an invalid channel number.

In one illustrative example implementation, when the delimiter key 104 of remote control 100 is pressed, a display such as that in FIG. 3A may be provided on the television screen. This display may be provided, for example, as a pop-up window which overlays a portion of the currently displayed picture. As described below, in an alternative implementation, this display may be provided on the remote control itself. The "Quick Channel" display of FIG. 3A includes two columns. The first column 302 lists the quick channel key presses (i.e., -1, -2, -3, etc.) and the second column 304 identifies the channel associated with the key presses. The channel number can have an antenna input (e.g., "A" or "B") associated with it if the television has multiple antenna inputs. In the FIG. 3A example, the "-1" combination of key presses is associated with channel 12 on antenna input "A". Thus, pressing the "-" key followed by the "1" key will cause the television to tune to channel 12 on antenna input "A". If the television currently is on some other input, it will change the input to antenna "A" first, then tune to channel 12.

Similarly, the "-2" combination of key presses is associated with channel 3-1 on antenna input "B" and the pressing of the dash key "-" followed by the "2" key will cause the television to tune to channel 3-1 on antenna input "B". The FIG. 3A example is a "full form" display that shows the associations for all the digits 0-9, even if a particular digit has no channel associated therewith. As shown in FIG. 3A, no channels have been associated with the "-4", "-5", "-8", "-9" and "-0" key press combinations. Thus, no channel change will happen if these key combinations are pressed.

In one example implementation, the display of FIG. 3A remains on-screen for a predetermined "time-out" period after pressing the dash key "-" and the viewer must press a digit key while the FIG. 3A display is active in order to effect quick channel entry. During the time when the FIG. 3A is active, other key presses and inputs (e.g., volume up/down) may be handled as they are when the viewer is watching television. If the time-out period expires and no digit key has been pressed, the FIG. 3A display is removed and the viewer returns to watching television.

FIG. 3B shows an example "short form" version of the display in which only those digits having channels associated therewith are displayed.

FIG. 3C shows an example display for the case in which no channels have been associated with any of the digits. In this case, the display reminds the viewer to set up the quick tune feature.

FIG. 4 shows an example quick tune set-up display that allows the viewer to set up the associations between the digits and the channels. The FIG. 4 display may be accessed via an on-screen menu display or via predetermined key inputs to remote control 100. The display includes a heading 402 designating the display as the "Quick Channel Entry Setup." A first column 404 lists the digits, a second column 406 lists antenna inputs associated with the channels, and a third column 408 identifies the channels associated with each of the digits. The viewer may navigate to the antenna input and channel entry fields for a particular digit and then enter an antenna input and a channel. A visual indicator such as a cursor may be used to indicate which field currently "has focus" so that data may be entered therein. The navigation to different fields may be accomplished using, for example, arrow keys (not shown) on the remote control. The channel may be entered using the digit keys 0-9, and if needed, the delimiter key 104. The antenna input maybe selected by toggling or stepping through the antenna inputs (e.g., "A", "B", etc.) using channel up/down key 106 when the visual indicator is positioned in column 406. Data indicative of available antenna inputs may be stored in memory 268 in order to provide the list through which the viewer toggles or steps in order to make a selection. As shown in FIG. 4, channel 12 on antenna input "A" has been associated with digit 1; channel 3-1 on antenna input "B" with digit 2; channel 3-2 on antenna input "B" with digit 3; channel 101-1 on antenna input "B" with digit 6; and channel 9999 on antenna input "A" with digit 7.

The pop-up display options 410 allow the viewer to set which display will pop up when the delimiter key is pressed. In the FIG. 4 example, the viewer may select a short form pop-up like that of FIG. 3B, a full form pop-up like that of FIG. 3A or no pop-up at all.

The set-up display also permits the viewer to clear all of the channel entry fields by pressing button 412; to cancel a current set-up operation by pressing button 414; and to save the current digit-channel associations in memory 268 of television 200 by pressing button 416.

The viewer may also set up an association between a digit and a currently tuned channel being viewed. For example, pressing the delimiter key 104 twice followed by a digit key and then an Enter/Select key may cause the control section 254 of television 200 to initiate a routine for associating the currently tuned channel with the entered digit. If there is currently no channel associated with the entered digit, the control section 254 of the television creates the association and stores it in memory 268. A confirmatory display screen to this effect may be provided if desired. If there is a channel currently associated with the entered digit, the control section 254 may generate a display prompting the viewer to override the current association or to choose another digit. In some implementations, the display may identify to the viewer the digits that are not currently associated with any channel. In still other implementations, pressing the delimiter key twice will bring the viewer to the channel set-up screen of FIG. 4 with the currently tuned channel information automatically filled into available antenna input entry and channel entry fields (e.g., the antenna input and channel entry fields associated with the lowest available digit). The current channel may be visually distinguished (e.g., by blinking, highlighting, different colors, etc.) to make it easier for the viewer to recognize the new entry. The viewer may then press button 416 to save the displayed digit-channel associations.

Data indicative of the digit-channel association (including antenna inputs if available), along with data indicative of the selected pop-up display option, are stored in memory 268. When the quick channel feature is used, control section 254 accesses memory 268 and takes action based on the data in the memory. That is, control section 254 accesses memory 268 to determine which channel to tune in response to the pressing of the delimiter and one of the digits 0-9.

Memory 268 may store more than one table of digit-channel associations. For example, the memory may store a different table for each of a plurality of different viewers. Each table may be associated with a viewer name. A viewer may press one or more keys to cause a display to appear on the television screen that identifies a list of viewer names for those viewers who have tables stored in memory 268. The viewer may then select his/her own name and the television will thereafter use the table associated with that viewer name to determine which channel to tune when a quick channel entry is made. In another example implementation, the television may provide a display each time the television is turned on to prompt a viewer to select his/her name from the list of viewer names. Here again, the television will thereafter use the table associated with the selected viewer name to determine which channel to tune when a quick channel entry is made. Alternatively, one of the tables may be designated as a default table when the television is turned on. The set-up process may also be modified to include an initial selection of viewer names to determine which table of digit-channel associations is created or modified.

The digit-channel associations may be changed based on time of day, day of week, date, month, etc. Thus, on a Sunday afternoon, the channel entries may be populated with sporting events such as football games. In the evenings, the channel entries may be populated with movie channels. These time-varying associations may be set up in accordance with viewer inputs or may be set up automatically by the control circuit of the television based, for example, on information contained in interactive programming guide data.

In addition, the digits need not be associated with channels, but can be associated with a particular type of programming. For example, "0" could be associated with "baseball" and pressing "-0" would tune the television to a channel showing a baseball game. If more than one game were currently available, repeatedly pressing "-0" would tune the television to other baseball games. After the last game had been tuned, pressing "-0" would tune the television back to the first tuned channel showing a baseball game. The quick tune feature may be configured so that certain teams would have priority. For example, the feature may be configured so that if a New York Yankees game is airing, that game is tuned to first when "-0" is pressed. Similarly, digits could be associated with news channels, movies, sitcoms and other sporting events such as football and basketball. Here again, the repeated pressing of the delimiter and the digit associated with the particular type of programming would cause the television to sequentially tune some or all of the channels currently airing programs having that type of programming. This arrangement simplifies the channel tuning process and allows a viewer to easily tune to programming of a particular type.

The viewer may set up an association between a digit and a type of programming in various ways. For example, some televisions receive programming content in which certain channels are news-type channels. In this case, the viewer may set up an association between a single digit and a plurality of news-type channels. For example, using a modification of the set-up display of FIG. 4, "0" could be associated with the channel numbers (and antenna inputs, if applicable) for CNN, FOXNEWS, MSNBC, etc. Pressing "-0" a first time would tune to the channel number and, if applicable, antenna input, for CNN; pressing "-0" a second time would tune to the channel number and, if applicable, antenna input, for FOXNEWS; pressing "-0" a third time would tune to the channel number and, if applicable, antenna input, for MSNBC, etc. Similar associations may be set up for sports channels, movie channels, children's channels, etc.

Another way to set up an association between a digit and a type of programming uses interactive programming guide (IPG) data that can be sent to televisions, for example, via satellite and cable television systems. This IPG data is stored in memory 258 and can be used to generate displays of program listings for viewers. Using a modification of the set-up display of FIG. 4, the program "themes" or "categories" contained in the IPG data can be associated with various digits. For example, baseball can be associated with "4", football with "8" and hockey with "9". Alternatively or additionally, the association can be set up in response to the entry of a predetermined key sequence (e.g., pressing delimiter key 104 twice, followed by a digit and then an Enter/Select key) when a program is being viewed to thereby cause the theme or category of the viewed program to be associated with a digit.

The digits can also be associated with operations other than channel tuning. For example, the digits may be associated television inputs such as input component video, color stream, HDMI, etc. For example, if "0" is associated with a "VIDEO 1" input, pressing "-0" would change the television input to "VIDEO 1", if the current input is different. This is especially useful for those televisions which have a plurality of inputs, but require many key presses to access them. The associations between digits and inputs may be set up, for example, using a modification of the set-up display screen of FIG. 4. Alternatively or additionally, the association can be set up in response to the entry of a predetermined key sequence (e.g., pressing delimiter key 104 twice, followed by a digit and then an Enter/Select key) when a particular input is active.

Furthermore, the digits can be associated with television menu screens. For example, accessing a "Rating Setup" window might require up to six remote control key presses. Using disclosed method and device, the viewer could associate "0" with the window so that pressing "-0" would bring up the window. The key presses are reduced to two in this case. The associations between digits and menu screens may be set up, for example, using a modification of the set-up display screen of FIG. 4. Alternatively or additionally, the association can be set up in response to the entry of a predetermined key sequence (e.g., pressing delimiter key 104 twice, followed by a digit and then an Enter/Select key) when a particular menu screen is displayed.

Figure 5:
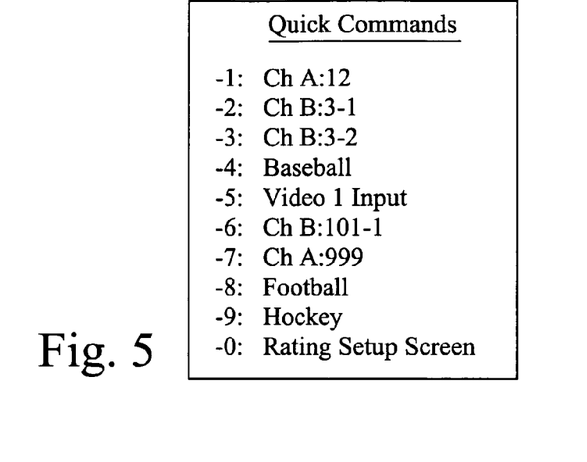
FIG. 5 is an example display screen for use during various control operations.

FIG. 5 is an example display screen for use during various control operations discussed above and shows digits assigned to various channel tuning operations (based on both channel numbered themes), input switching and menu screen selection. This screen may be displayed, for example, when the dash key "-" is pressed to inform the viewer of the associations between the digits and the control operations.

As can be seen, the operation using the example remote control described above reduces the number of keys needed, for example, to tune to a channel In addition, because most remote controls now include a delimiter key, there is no need to add new keys to the remote control and the channel tuning operation is consistent from one remote control to another. Generally, delimiters such as "-" have not been provided on conventional analog remote controls since analog channels can be entered by simply using the digit keys 0-9. As a result, in many cases the delimiter key will be a new addition to a remote control for digital televisions and its use will generally be limited to separating the major and minor channels of a digital channel. This limited use of a new key on the remote control allows relatively easy implementation of the quick channel entry feature, without affecting or displacing any existing remote control functionality.

In addition, the delimiter key will typically be grouped together with, or at be adjacent to, the digit keys. As a result, multiple key presses using the delimiter key and the digit keys will be easy, quick and natural. Thus, the quick channel entry feature will provide a user-friendly interface for the viewer.

In the example remote control 100, the delimiter key is a dash (i.e., "-"). Of course, other delimiters such as "." and the like may be used. In addition, the control device and method are not limited to a use of a delimiter key but may involve, for example, use of some other key which, like a delimiter key, would not (apart from the control operations described herein) initiate any operation if pressed by itself.

Further, although the control operations have been described above with respect to a digital television, the disclosed method and device are readily applicable to other systems in which simplified control operations are desirable such as analog televisions. The quick tune feature may also be provided for a set-top box for a cable or satellite system to which a television is connected.

Figure 6:
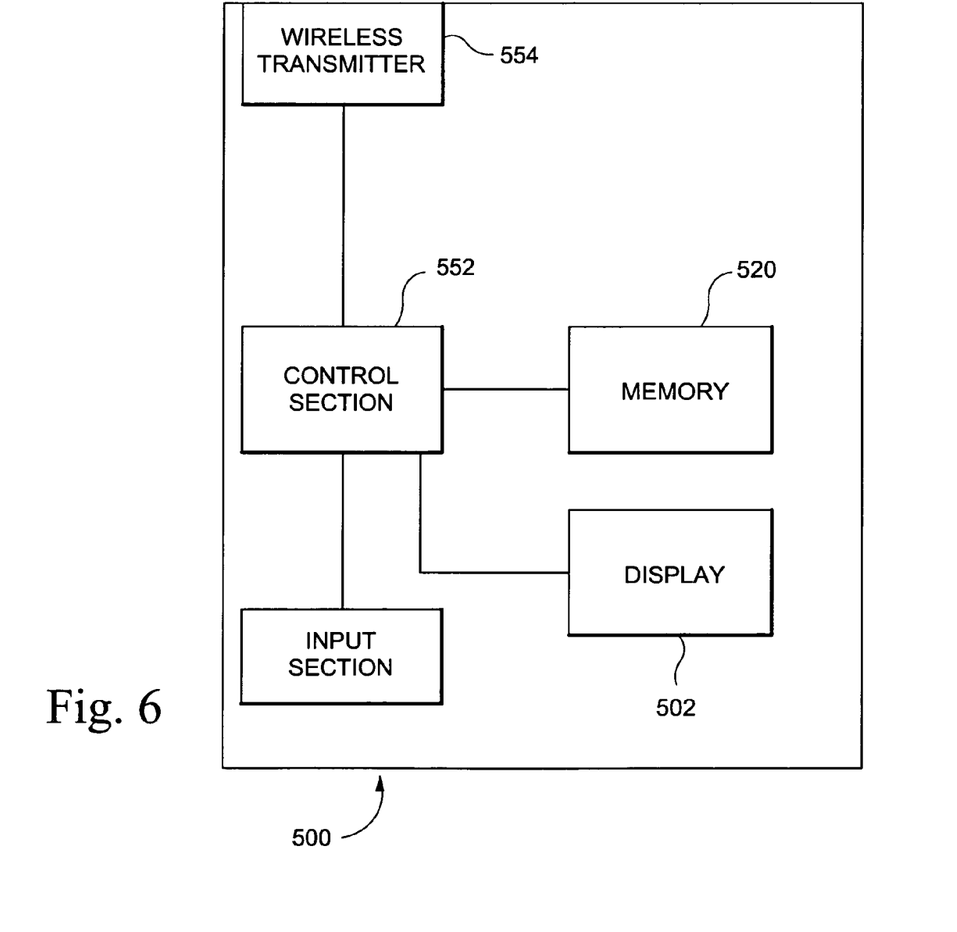
FIG. 6 is a block diagram showing the details of another example remote control 500.

FIG. 6 shows another example embodiment of a remote control 500. Remote control 500 is similar to the remote control 100 shown in FIG. 1, but further includes a display 502. In addition, in the FIG. 6 remote control embodiment, the digit-channel associations are stored in the memory 520 of the remote control. For example, "0" may be associated with channel 263-3, "1" may be associated with channel 54-3, etc. When the viewer presses the delimiter key, control section 552 accesses the memory 520 to determine what channel number or input selection is associated with the number on the keypad that is pressed after the delimiter key. Thus, if the viewer presses "-" and "0", control section 552 accesses the memory 520 and then controls wireless transmitter 554 to send a signal corresponding to channel 263-3 to the television. Control section 254 of the television uses this signal to control tuner 256 to tune to this channel. Display 502 (such as a liquid crystal display) can provide displays corresponding to those of FIGS. 3A, 3B, 3C and 4 to assist the viewer in using and setting up the quick channel entry feature. By using the FIG. 6 remote control, the quick channel entry capability may be provided within the remote control itself. Thus, this remote control can be used with televisions that do not include the quick channel entry feature at the time of manufacture.

The remote control described herein may be provided as part of the functionality of another device such as a personal digital assistant (PDA) or a mobile (cellular) telephone. For example, a PDA including a touch-sensitive screen may execute a remote control program in which an arrangement of "soft keys" including a delimiter or other predetermined quick channel entry key is displayed on the touch-sensitive display. The quick channel entry feature is accessed by pressing the delimiter "soft-key" using a finger or stylus followed by one of the digit "soft-keys" 0-9. In the case of a television, these presses cause the television to be tuned to the channel associated with the actuated digit. As with the remote control described in connection with FIG. 6, the associations between the digits and channel entry and/or input selection may be stored in the memory of the PDA and the pressing of the delimiter and digit key will result in the sending to the television of a wireless signal for tuning to the channel and/or selecting the input associated with the pressed digit.

In addition, while the illustrative example remote control has been described herein with reference to tuning digital television channels, the quick channel entry feature is easily applied to other applications involving channel tuning such as tuning radio channels. The quick tuning feature may also be applied to the quick "tuning" of favorite songs on digital music playback devices.

While there has been shown and described various embodiments of the present invention, it will be evident to those skilled in the art that various modifications may be made thereto without departing from the scope of the invention which is set forth in the appended claims.

I claim:

1. A method of controlling a controllable device using a control device comprising a numeric keypad and a delimiter key, comprising:
respectively associating each of multiple different control operations for the controllable device with a respective corresponding digit key of the numeric keypad; and
initiating a first control operation in response to an input sequence of only two keys in which the delimiter key is followed by a first digit key associated with the first control operation, and initiating a second control operation in response to an input sequence of only two keys in which the delimiter key is followed by a second digit key associated with the second control operation, wherein the first digit key is different than the second digit key and the first control operation is different than the second control operation.

2. The method according to claim 1, wherein the delimiter key is a period key.

3. The method according to claim 1, wherein the delimiter key is a dash key.

4. The method according to claim 1, wherein the control device is embodied as a remote control.

5. The method according to claim 1, wherein the control device is embodied as a personal digital assistant.

6. The method according to claim 1, wherein the control device is embodied as a wireless telephone.

7. The method according to claim 1, wherein the controllable device is a television and the control operations include one or more channel tuning operations.

8. The method according to claim 7, wherein one or more of the channel tuning operations involves an antenna selection.

9. The method according to claim 1, wherein the control operations include one or more menu screen selection operations.

10. The method according to claim 1, wherein the control operations include one or more signal input selection operations.

11. A method of tuning channels using a tuning control device comprising a numeric keypad and a delimiter key used to separate major and minor channel numbers of a digital television channel, the method comprising:
   storing, in a memory, data that associates each of multiple different program types with a respective corresponding digit key of the numeric keypad; and
   tuning a channel showing a program of a particular first program type in response to an input sequence of only two keys in which the delimiter key is followed by a first digit key associated with the particular first program type, and tuning a channel showing a program of a particular second type in response to an input sequence of only two keys in which the delimiter key is followed by a second digit key associated with the particular second program type, wherein
   the first digit key is different than the second digit key and the first program type is different than the second program type.

12. The method according to claim 11, further comprising:
   tuning another channel showing a program of the particular program type in response to another input sequence of only two keys in which the delimiter key is followed by the same digit key.

13. A memory having stored therein a data structure comprising a plurality of different control operations for a controllable device respectively associated with a corresponding digit, wherein a processing device of the controllable device is responsive to a sequence of only two inputs in which a delimiter is followed by a digit for accessing the data structure to determine the control operation associated with the input digit and thereafter to initiate the determined control operation, wherein
   a first control operation is initiated in response to an input sequence of only two keys in which the delimiter key is followed by a first digit key associated with first control operation, and a second control operation is initiated in response to an input sequence of only two keys in which the delimiter key is followed by a second digit key associated with the second control operation, wherein
   the first digit key is different than the second digit key and the first control operation is different than the second control operation.

14. The memory according to claim 13, wherein the controllable device comprises a television and the memory is embodied as part of the television.

15. The memory according to claim 13, wherein the controllable device comprises an audio receiver and the memory is embodied as part of the audio receiver.

16. The memory according to claim 13, wherein the controllable device comprises a set-top box and the memory is embodied as part of the set-top box.

17. A remote control for a controllable device comprising:
   a keypad comprising digit keys and a delimiter key;
   a wireless transmitter;
   a memory for storing data that respectively associates each of multiple different control operations for the controllable device with a respective corresponding digit key of the numeric keypad; and
   a control circuit responsive to an input sequence of only two keys in which the delimiter key is followed by one of the digit keys for controlling the wireless transmitter to transmit to the controlled device a signal for initiating the control operation associated with the one digit key, wherein
   a first control operation is initiated in response to an input sequence of only two keys in which the delimiter key is followed by a first digit key associated with first control operation, and a second control operation is initiated in response to an input sequence of only two keys in which the delimiter key is followed by a second digit key associated with the second control operation, wherein
   the first digit key is different than the second digit key and the first control operation is different than the second control operation.

18. The remote control according to claim 17, further comprising:
   a display device for providing a display showing the correspondence between the digit keys and the control operations when the delimiter key is pressed.

19. The remote control according to claim 17, wherein the control operations are for a television.

20. The remote control according to claim 17, wherein the control operations are for an audio receiver.

21. The remote control according to claim 17, wherein the control operations are for a set-top box.

22. A controllable device comprising:
   an input section comprising digit keys and a delimiter key;
   a memory storing a data structure comprising a plurality of different control operations for the controllable device each respectively associated with a corresponding one of the digit keys;
   a control section responsive to an input sequence of only two keys in which the delimiter key is followed by one of the digit keys for initiating the control operation associated with the pressed digit in the data structure stored in the memory, wherein
   a first control operation is initiated in response to an input sequence of only two keys in which the delimiter key is followed by a first digit key associated with first control operation, and a second control operation is initiated in response to an input sequence of only two keys in which the delimiter key is followed by a second digit key associated with the second control operation, wherein
   the first digit key is different than the second digit key and the first control operation is different than the second control operation.

23. The controllable device according to claim 22, further comprising:
   a display device for providing a display showing the correspondence between the digit keys and the control operations when the delimiter key is pressed.

24. The controllable device according to claim 22, wherein the input section is embodied as part of a wireless remote control.

25. A television comprising:
    a tuner;
    an input section comprising digit keys and a delimiter key;
    a memory storing a data structure comprising a plurality of different programming types each respectively associated with a corresponding one of the digit keys;
    a control section responsive to an input sequence of only two keys in which the delimiter key is followed by one of the digit keys for controlling the tuner to tune a channel showing a program of the particular programming type which corresponds to the pressed digit key, wherein
    a channel showing a program of a particular first program type is tuned in response to an input sequence of only two keys in which the delimiter key is followed by a first digit key associated with the particular first program type, and a channel showing a program of a particular second type is tuned in response to an input sequence of only two keys in which the delimiter key is followed by a second digit key associated with the particular second program type, wherein
    the first digit key is different than the second digit key and the first program type is different than the second program type.

26. The television according to claim 25, wherein the control section controls the tuner to tune another channel showing a program of the particular program type in response to another input sequence of only two keys in which the delimiter key is followed by the same digit key.

27. The television according to claim 25, further comprising:
    a display for displaying the correspondence between the digit keys and the programming types in response to the delimiter key.

28. The television according to claim 25, wherein the input section is embodied as part of a wireless remote control.

29. A television comprising:
    a tuner;
    an input section comprising digit keys and a delimiter-like key;
    a memory storing a data structure comprising a plurality of different channels each respectively associated with a corresponding one of the digit keys;
    a control section responsive to an input sequence of only two keys in which the delimiter-like key is followed by one of the digit keys for controlling the tuner to tune the channel that corresponds to the one digit key, wherein
    a first channel is tuned in response to an input sequence of only two keys in which the delimiter key is followed by a first digit key associated with the first channel, and a second channel is tuned in response to an input sequence of only two keys in which the delimiter key is followed by a second digit key associated with the second channel, wherein
    the first digit key is different than the second digit key and the first channel is different than the second channel.

30. The television according to claim 29, wherein the associations between the channels and the digits automatically vary as a function of time.

31. A method of controlling a controllable device comprising a display screen using a control device comprising a numeric keypad and a delimiter key, the method comprising:
    generating an on-screen display in response to a delimiter key input at the beginning of an input key sequence, the display showing control operations and keypad codes corresponding thereto; and
    initiating a control operation in response to input of the keypad code corresponding thereto, wherein
    a first control operation is initiated in response to an input sequence of only two keys in which the delimiter key is followed by a first digit key associated with the first control operation, and a second control operation is initiated in response to an input sequence of only two keys in which the delimiter key is followed by a second digit key associated with the second control operation, wherein
    the first digit key is different than the second digit key and the first control operation is different than the second control operation.

* * * * *